(12) United States Patent
Fujino

(10) Patent No.: US 8,400,653 B2
(45) Date of Patent: Mar. 19, 2013

(54) PRINTING SYSTEM AND METHOD FOR PREVENTING PRINTOUTS FROM BEING LEFT IN OUTPUT TRAY

(75) Inventor: Akinobu Fujino, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1292 days.

(21) Appl. No.: 11/974,731

(22) Filed: Oct. 16, 2007

(65) Prior Publication Data

US 2008/0259386 A1  Oct. 23, 2008

(30) Foreign Application Priority Data

Oct. 17, 2006  (JP) ................................ 2006-282623

(51) Int. Cl.
*G06F 3/12*  (2006.01)

(52) U.S. Cl. ........ 358/1.15; 101/2; 209/630; 270/52.03; 271/288; 271/298; 358/1.12; 399/403; 700/214

(58) Field of Classification Search ................ 358/1.15, 358/1.1, 1.12; 101/2; 209/630; 270/1.01, 270/52.01, 58.01; 271/288, 298; 399/1, 399/403; 414/789.9; 700/214
See application file for complete search history.

(56) References Cited

U.S. PATENT DOCUMENTS

| | | | | |
|---|---|---|---|---|
| 4,768,767 A | * | 9/1988 | Orr et al. .................... | 270/58.01 |
| 5,358,238 A | * | 10/1994 | Mandel et al. ............... | 271/298 |
| 5,435,544 A | * | 7/1995 | Mandel ......................... | 271/298 |
| 5,913,015 A | * | 6/1999 | Watanabe et al. ............ | 358/1.12 |
| 6,152,629 A | * | 11/2000 | Yoneyama et al. .......... | 400/582 |
| 6,568,538 B1 | * | 5/2003 | Robey .......................... | 209/630 |
| 6,714,313 B1 | * | 3/2004 | Sugaya ........................ | 358/1.15 |
| 6,781,708 B1 | * | 8/2004 | Wada ........................... | 358/1.12 |
| 2002/0083114 A1 | * | 6/2002 | Mazzagatte et al. ......... | 709/100 |
| 2003/0227647 A1 | * | 12/2003 | Gallacher .................... | 358/1.15 |
| 2004/0080783 A1 | * | 4/2004 | Owen et al. ................. | 358/1.15 |
| 2006/0238797 A1 | * | 10/2006 | Berglin ........................ | 358/1.15 |

FOREIGN PATENT DOCUMENTS

| | | |
|---|---|---|
| JP | 09-325868 | 12/1997 |
| JP | 2000-155506 | 6/2000 |
| JP | 2002-067457 | 3/2002 |
| JP | 2003-015851 | 1/2003 |
| JP | 2004-192273 | 7/2004 |
| JP | 2004-362255 | 12/2004 |
| JP | 2005-035145 | 2/2005 |
| JP | 2005-044018 | 2/2005 |

(Continued)

OTHER PUBLICATIONS

Machine translation of JP09-325868 as relied upon by the examiner.*

*Primary Examiner* — King Poon
*Assistant Examiner* — David S Cammack
(74) *Attorney, Agent, or Firm* — Edwards Wildman Palmer LLP; David G. Conlin; Steven M. Jensen

(57) ABSTRACT

A printing system prevents mistakes such as that a printed paper sheet printed by requesting from a PC to an image forming apparatus is left in an ejected-paper tray. The image forming apparatus transmits to the server printing execution result information that includes the serial number and the time and date of the printing. The server manages the state of unfetch of the printed paper sheet using a fetch flag in a printing record list created based on the printing execution result information, changes the fetch flag from "unfetched" to "fetched" when information indicating that the printed paper sheet has been fetched is sent from the image forming apparatus.

23 Claims, 13 Drawing Sheets

FOREIGN PATENT DOCUMENTS

| | | |
|---|---|---|
| JP | 2005-045551 | 2/2005 |
| JP | 2005-352685 | 12/2005 |
| JP | 2006-095751 | 4/2006 |
| JP | 2006-150809 | 6/2006 |
| JP | 2006-209170 | 8/2006 |
| JP | 2006-224306 | 8/2006 |

* cited by examiner

FIG. 2

PRINTING RECORD LIST

| IMAGE FORMING APPARATUS | SERIAL NUMBER | INFORMATION PROCESSING APPARATUS | USER ID | FETCH FLAG | NUMBER OF SHEETS OF JOB | TIME AND DATE OF PRINTING | EJECTED-PAPER TRAY NUMBER |
|---|---|---|---|---|---|---|---|
| AR-M350 | 1309 | A | 12345 | ○ | 6 | 2006/6/4 15:30 | 5 |
| | 1310 | C | 12325 | ○ | 4 | 2006/6/4 15:54 | 2 |
| | 1311 | C | 98721 | × | 1 | 2006/6/4 16:10 | 8 |
| | 1312 | B | 12325 | ○ | 3 | 2006/6/4 16:25 | 3 |
| | --- | | | | --- | | |
| AR-C540 | 2450 | B | 12325 | × | 1 | 2006/6/3 10:25 | 7 |
| | 2452 | A | 98721 | × | 25 | 2006/6/3 13:25 | 5 |
| | 2454 | D | 12325 | ○ | 3 | 2006/6/3 13:47 | 8 |

FIG. 3

| SERIAL NUMBER | TYPE OF PRINTING | NAME OF FILE | NAME OF USER | PASSWORD |
|---|---|---|---|---|
| 1310 | CONFIDENTIAL PRINTING | ○○○ | | 7fhs |
| 1311 | CONFIDENTIAL PRINTING | × × × | | 9fhs |
| 1312 | PERSONAL AUTHENTICATING PRINTING | △△ | inoue | afgh |
| 1315 | PERSONAL AUTHENTICATING PRINTING | & & & | ueda | fds |
| 1316 | PERSONAL AUTHENTICATING PRINTING | ▨▧▨ | inoue | afgh |
| | | | | |
| | | | | |

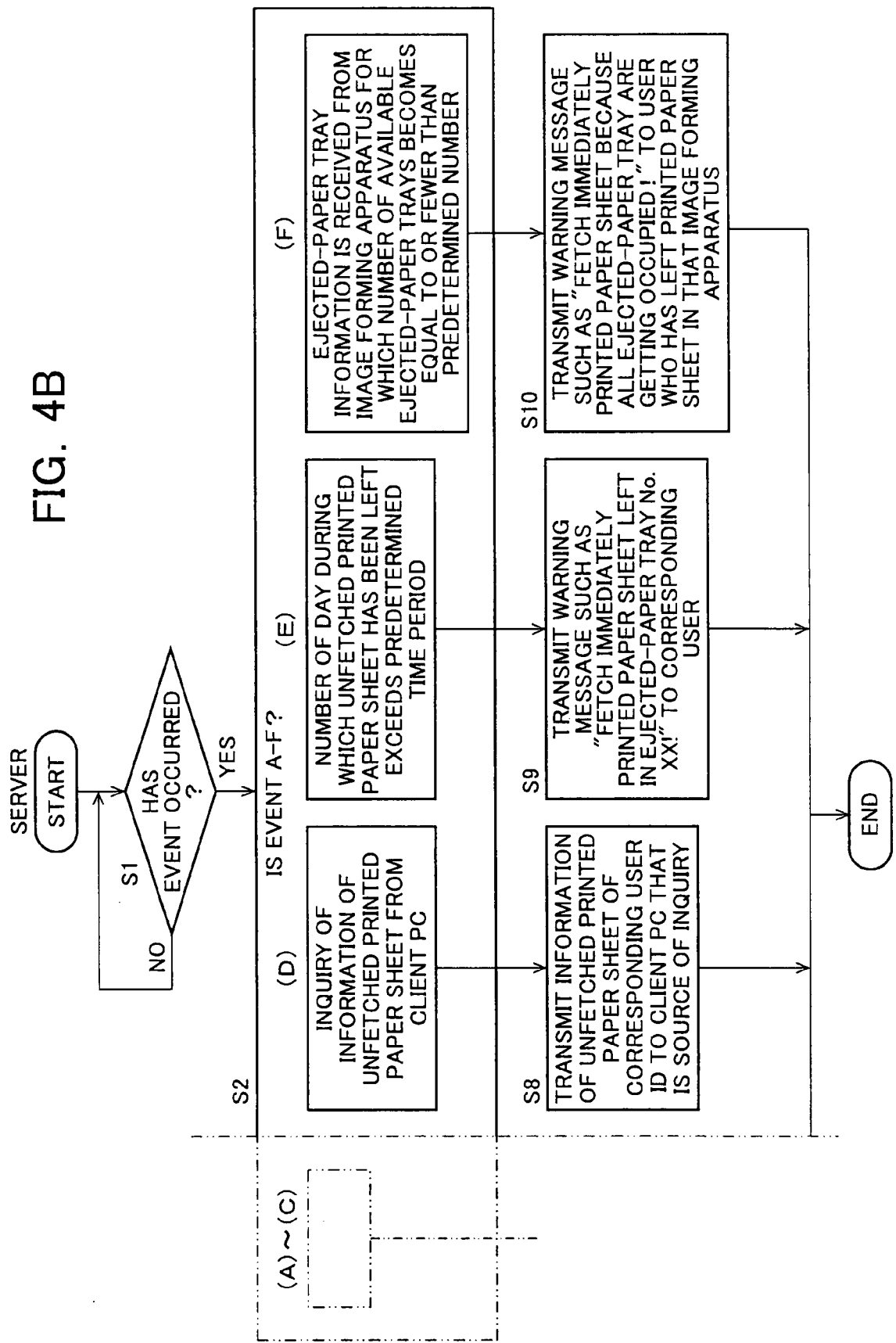

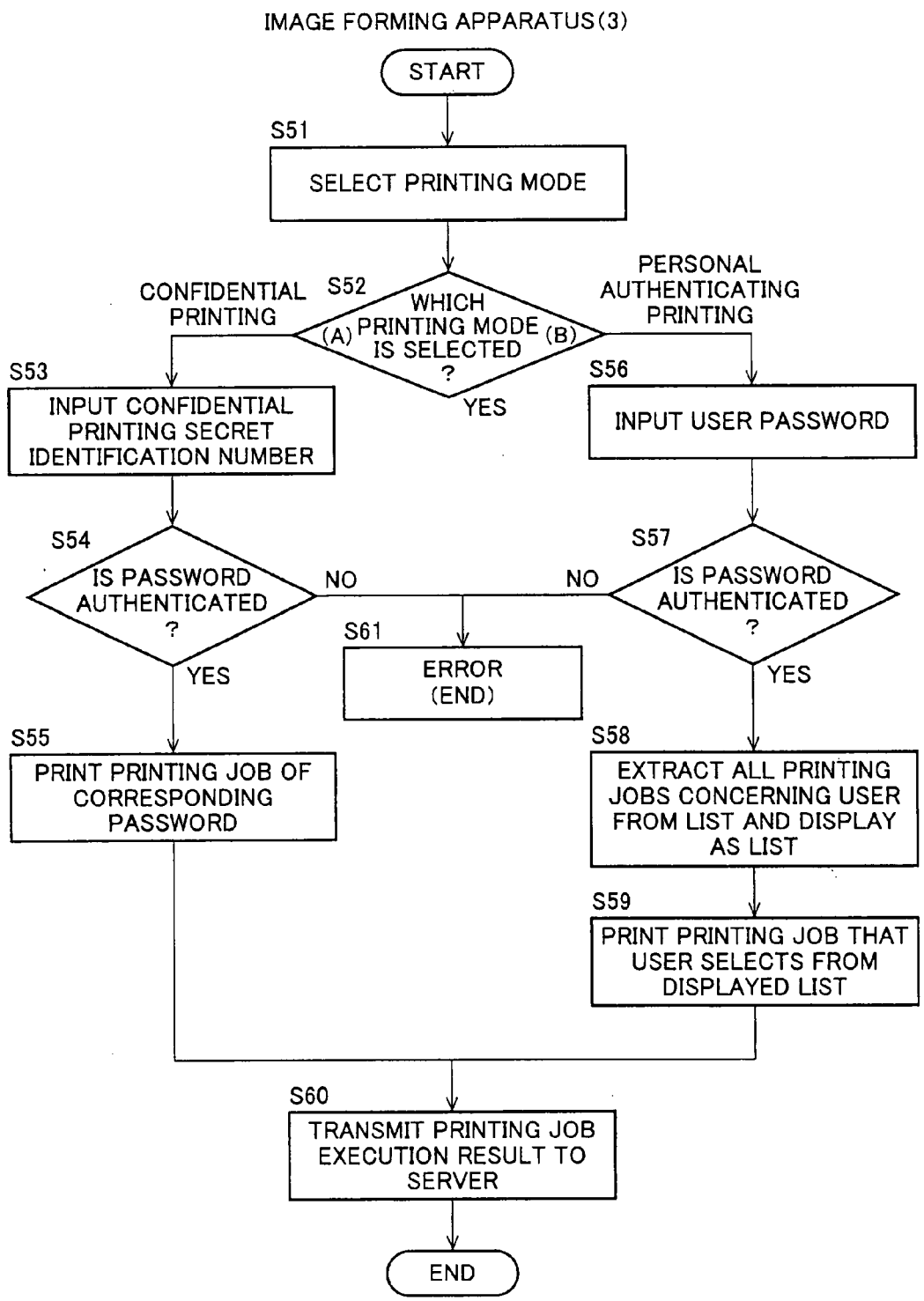

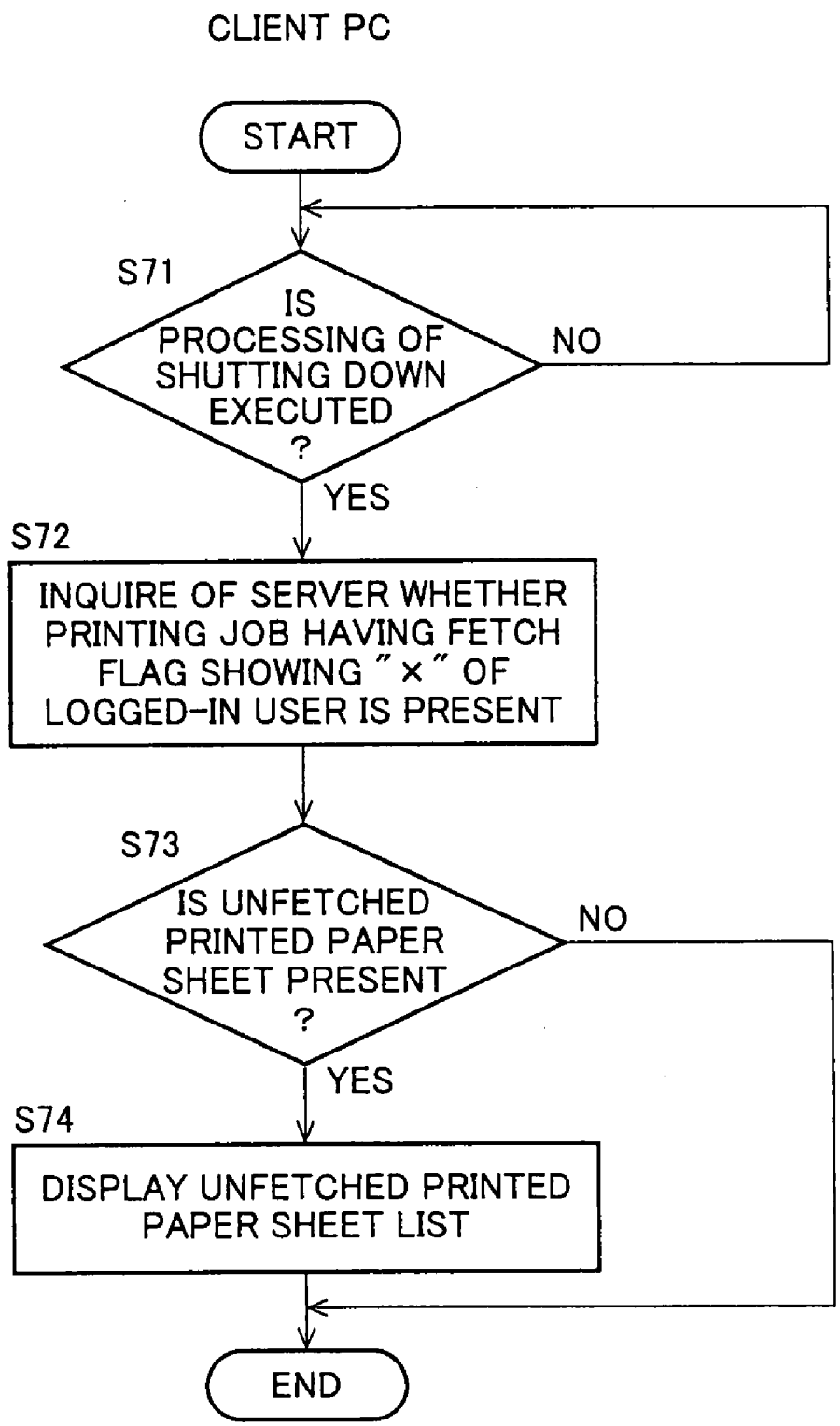

FIG. 11

| AR-M350 MAIN SCREEN |

HELLO, MR. INOUE

JOBS YOU ARE STORING ARE THE FOLLOWING TWO.
SELECT THE JOB TO BE EXECUTED AND PRESS EXECUTION BUTTON.

| JOB NUMBER | NAME OF FILE | TIME OF EXECUTION | JOB MODE |
|---|---|---|---|
| 1312 | △△ | 2006/07/19 | Copy |
| 1316 | ■■■ | 2006/07/31 | Print |

EXECUTION

PRINTING SYSTEM AND METHOD FOR PREVENTING PRINTOUTS FROM BEING LEFT IN OUTPUT TRAY

CROSS-NOTING PARAGRAPH

This Nonprovisional application claims priority under 35 U.S.C. §119(a) on Patent Application No. 2006-282623 filed in JAPAN on Oct. 17, 2006, the entire contents of which are hereby incorporated herein by references.

FIELD OF THE INVENTION

The present invention relates generally to a printing system configured by connecting an image forming apparatus, a server, and an information processing apparatus to a network; and the server, the image forming apparatus, and the information processing apparatus that are used in the system, and, more particularly, to a technique of preventing a printed paper sheet printed in the image forming apparatus from being forgotten to be taken out or being erroneously taken for another one.

BACKGROUND OF THE INVENTION

Recently, a multi-function peripheral (MFP) including a printer, a scanner, a facsimile machine, etc., has become more multi-functional and more expensive. Therefore, many users use one MFP in an environment where many MFPs can not be afforded to install on each floor. In this context, the case where a user has forgotten executing printing and does not come to take out the printed paper sheet has been more often present and, therefore, problems have arisen that business operation may be obstructed, because no available ejected-paper tray is present because of printed paper sheets being left, etc.

As a printing system configured by connecting a plurality of client PCs, a printer, and an managing server to a network, for example, a system that enables to check the execution state of a printing job requested to be printed and the state of the printer, is provided by Japanese Laid-Open Patent Publication No. 9-325868, etc.

However, according to the above conventional technique, although it can be checked whether the printing job requested to be printed from one of the client PCs has been normally printed, it can not be known whether a printed paper sheet that has been printed is left in the ejected-paper tray can not be known. In addition, a problem may arise that, for an MFP provided with multiple ejected-paper trays, a paper sheet may be erroneously taken away by another person when resembling printed paper sheets have been ejected into adjacent trays.

SUMMARY OF THE INVENTION

The object of the present invention is to provide a printing system that enables a printed paper sheet obtained by printing a printing job requested to be printed from an information processing apparatus (hereinafter, "client PC") to an MFP (hereinafter, "image forming apparatus") to be prevented from being left for a long time in an ejected-paper tray, and that also enables a printed paper sheet to be prevented from being taken out from a wrong ejected-paper tray by mistake.

A first technical means is a printing system configured by connecting a server, an image forming apparatus, and a client PC to a network, wherein the image forming apparatus comprises: a function of transmitting to the server printing execution result information including at least information of the client PC that has requested the printing of the printing job, the logged-in user, and the date and the time of the printing, when the image forming apparatus executes printing of the printing job that is received from the client PC; and a function of giving a deletion request to the server for deleting from a printing record list, when it was checked that the printed paper sheet was fetched from the ejected-paper tray, the unfetched information for the printed paper sheet indicating that the printed paper sheet has not been fetched from the ejected-paper tray, and wherein the server comprises a function of creating a printing record list based on the printing execution result information sent from the image forming apparatus, managing the state whether the printed paper sheet is fetched from the tray in the image forming apparatus by executing the updating processing for changing a fetch flag from "unfetched" to "fetched" in the printing record list for the printing jobs that the deletion requests are respectively given from the image forming apparatus, and giving the information of unfetched printed paper sheet to the user of the client PC that requested the printing job for the printed paper sheet for which the fetch flag indicates "unfetched".

A second technical means is the printing system as defined in the first technical means, wherein, when the server receives from the image forming apparatus an inquiry about the information of unfetched printed paper sheet of a specific user, the server extracts the information belonging to the user that the fetch flag indicates "unfetched" from the printing record list, and transmits the extracted information of unfetched paper sheet to the image forming apparatus that dispatched the inquiry.

A third technical means is the printing system as defined in the first technical means, wherein the image forming apparatus comprises an operation displaying portion that displays a screen for inputting operations and a screen for presenting various pieces of information, and wherein the image forming apparatus gives an inquiry to the server when user identifying information is input from the display screen for taking out a printed paper sheet from an ejected-paper tray, and displays the information of unfetched printed paper sheet of the user on the operation displaying portion when that information is obtained.

A fourth technical means is the printing system as defined in the third technical means, wherein the image forming apparatus comprises a function of issuing to the server a deletion request to delete the information of unfetched printed paper sheet from the printing record list when a confirmation key is pressed down in a screen displaying the information of unfetched printed paper sheet, and wherein the server changes the fetch flag in the printing record list from "unfetched" to "fetched" when the server receives the deletion request from the image forming apparatus.

A fifth technical means is the printing system as defined in the third technical means, wherein, when the information of unfetched printed paper sheet received from the server includes information indicating that the user also has an unfetched printed paper sheet in some other image forming apparatuses, the image forming apparatus displays the information of unfetched printed paper sheet in the other image forming apparatus when the confirmation key is pressed in the screen that displays the information of unfetched printed paper sheet received from the server.

A sixth technical means is the printing system as defined in the first technical means, wherein the image forming apparatus comprises a function of numbering printing jobs received from the client PC consecutively, and wherein the image forming apparatus includes the serial number in the printing execution result information.

A seventh technical means is the printing system as defined in the first technical means, wherein the image forming apparatus comprises a storing portion, wherein, when the image forming apparatus receives a confidential printing job or a personal authentication printing job from the client PC, the image forming apparatus stores the printing job in the storing portion and adds the printing job to a job list that manages job information.

An eighth technical means is the printing system as defined in the seventh technical means, wherein, when the image forming apparatus has executed confidential printing according to an input of a password from the operation displaying portion, the image forming apparatus transmits printing execution result information to the server.

A ninth technical means is the printing system as defined in the seventh technical means, wherein, when the image forming apparatus executed personal authentication printing according to an input of a personal authentication number from the operation displaying portion, the image forming apparatus transmits printing execution result information to the server.

A tenth technical means is the printing system as defined in the sixth technical means, wherein, when the image forming apparatus executes printing in the image forming apparatus itself, the image forming apparatus stores in the storing portion printing record data of the printing job together with the serial number putted thereon.

An eleventh technical means is the printing system as defined in the seventh technical means, wherein, when the image forming apparatus issues the deletion request to the server, the image forming apparatus deletes the corresponding data from the printing record data stored in the storing portion.

A twelfth technical means is the printing system as defined in the tenth technical means, wherein the image forming apparatus comprises a plurality of ejected-paper trays, and stores the tray number of the ejected-paper tray to which a printed paper sheet was outputted when the printing was executed by including the tray number in the printing record data, and transmits the tray number to the server by including it in the printing execution result information.

A thirteenth technical means is the printing system as defined in the first technical means, wherein the image forming apparatus prints the identification information that identifies a printed paper sheet by including that information in the printed paper sheet when the image forming apparatus executes printing.

A fourteenth technical means is the printing system as defined in the twelfth technical means, wherein the image forming apparatus also displays the tray number of the ejected-paper tray to which the printed paper sheet is output when the image forming apparatus displays the information of unfetched printed paper sheet on the operation displaying portion.

A fifteenth technical means is the printing system as defined in the twelfth technical means, wherein the ejected-paper tray comprises a tray sensor that detects the presence of a paper sheet in the tray, and wherein the image forming apparatus comprises an ejected-paper tray managing portion that manages the state of use of the ejected-paper tray based on an output signal of the tray sensor.

A sixteenth technical means is the printing system as defined in the fifteenth technical means, wherein the ejected-paper tray managing portion monitors the number of available ejected-paper trays based on the output signal of the tray sensor and, transmits to the server ejected-paper tray information including information of the number of available ejected-paper trays when the number of available ejected-paper trays becomes equal to or fewer than a predetermined number.

A seventeenth technical means is the printing system as defined in the fifteenth technical means, wherein the ejected-paper tray managing portion executes a warning display on the operation displaying portion based on the output signal of the tray sensor when a printed paper sheet was taken out from a tray having a number that is different from the tray number in the information of unfetched printed paper sheet displayed on the operation displaying portion.

An eighteenth technical means is the printing system as defined in the sixteenth technical means, wherein, when the server receives the ejected-paper tray information from the image forming apparatus, the server transmits a warning message to a user who has left a printed paper sheet in the image forming apparatus based on the ejected-paper tray information and the information in the printing record list.

A nineteenth technical means is the printing system as defined in the first technical means, wherein the server transmits a warning message to a user who has left a printed paper sheet in an ejected-paper tray for a time period that is longer than a predetermined time period based on printing date and time information in the printing record list.

A twentieth technical means is the printing system as defined in the eighteenth technical means, wherein the warning message is transmitted to a portable information processing terminal of a user through the Internet.

A twenty-first technical means is the printing system as defined in the first technical means, wherein the client PC inquires of the server about whether the information of unfetched printed paper sheet exists when an event that is registered in advance occurs, and displays the information of unfetched printed paper sheet when that information is sent from the server.

A twenty-second technical means is the printing system as defined in the twenty-first technical means, wherein the events registered in advance include at least any of shutting down, logging out, or logging in.

A twenty-third technical means is an image forming apparatus to which a plurality of client PCs are connected through a network, wherein the image forming apparatus comprises a plurality of ejected-paper trays, and includes a function of creating a printing record list including information on at least the client PC that requested the printing of the printing job, the logged-in user, and the date and the time of the printing when the image forming apparatus executes printing of a printing job received from a client PC, and a function of executing the updating processing to change the fetch flags in the printing record list from "unfetched" to "fetched" for the printed paper sheets that were checked to be fetched from the ejected-paper trays, a function of managing the state of fetch of the printed paper sheets from the ejected-paper trays, and a function of giving the information of unfetched printed paper sheet to the user of the client PC that provided the printing job of the printed paper sheet for which the fetch flag indicates "unfetched".

A twenty-fourth technical means is a server to which an image forming apparatus and a client PC are connected through a network, wherein the server comprises a function of creating a printing record list based on printing execution result information sent from the image forming apparatus, a function of executing an updating processing to change the fetch flags in the printing record list from "unfetched" to "fetched" for the information of unfetched printed paper sheet that the image forming apparatus requests to delete, a function of managing the state of fetch of the printed paper sheets in the image forming apparatus, and a function of giving the information of unfetched printed paper sheet to the user of the client PC that provided the printing job of the printed paper sheet for which the fetch flag shows "unfetched".

A twenty-fifth technical means is a client PC to which an image forming apparatus and a server are connected through a network, wherein the client PC inquires of the server about whether information of unfetched printed paper sheet exists when an event registered in advance in the server occurs, and displays the information of unfetched printed paper sheet when that information is sent from the server.

BRIEF DESCRIPTION OF THE DRAWINGS

FIG. 2 shows an example of a printing record list created by a managing server;

FIG. 3 shows an example of a job list concerning confidential printing and personal authentication printing managed in an image forming apparatus;

FIGS. 4A and 4B are explanatory flowcharts of processing executed by a control portion in a server;

FIG. 7 is an explanatory flowchart of processing executed when printing data for the authentication printing or the confidential printing is received in the image forming apparatus;

FIG. 8 is an explanatory flowchart of an example of processing in a client PC to display the information about unfetched printed paper sheet by inquiring of the server about whether the information of unfetched printed paper sheet exists;

FIG. 11 depicts an example of a job selection screen for executing the personal authentication printing in the image forming apparatus.

PREFERRED EMBODIMENTS OF THE INVENTION

Figure 1:
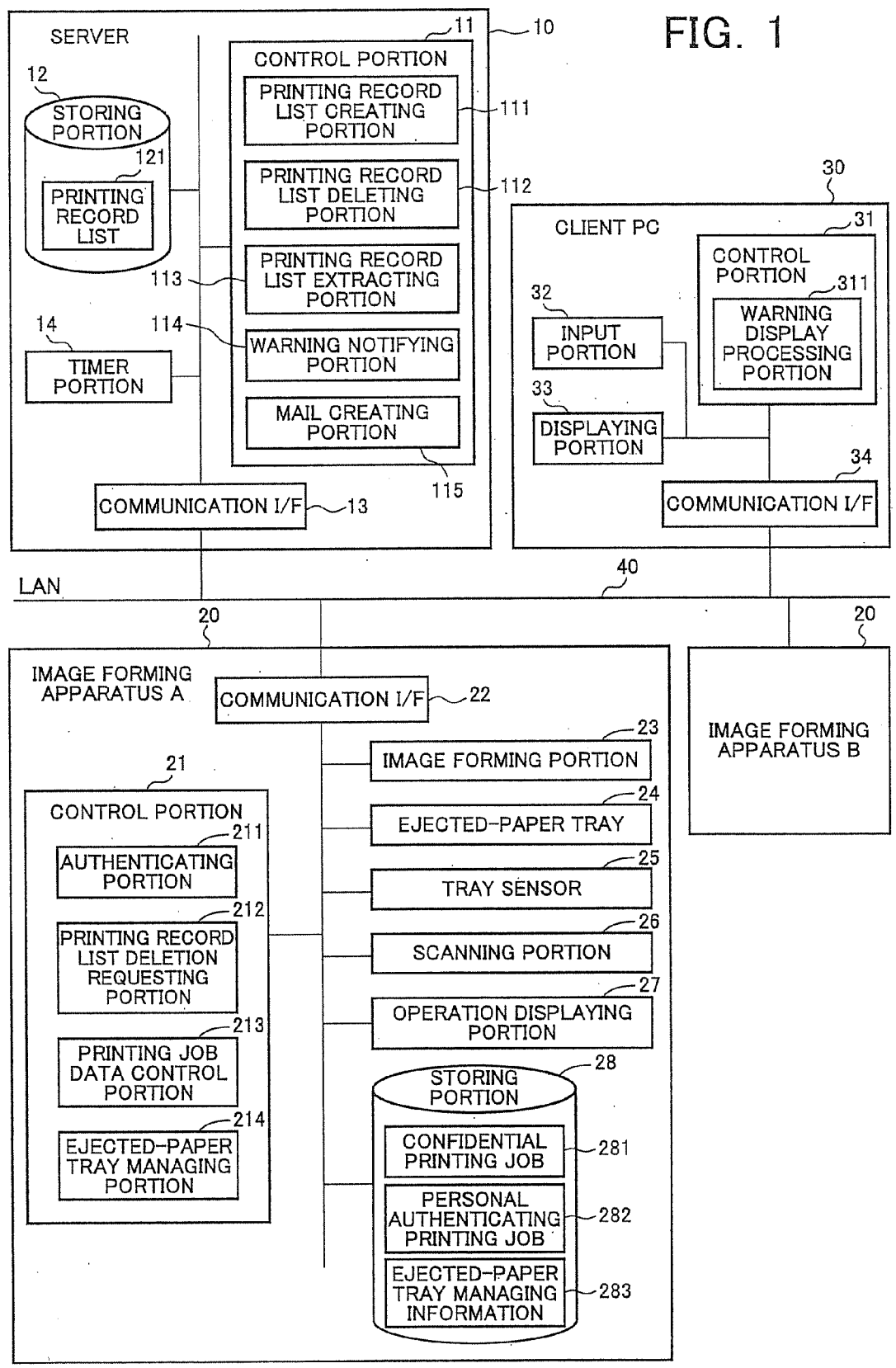
FIG. 1 is an explanatory block diagram of a printing system in an embodiment of the present invention.

FIG. 1 is an explanatory diagram of a printing system in an embodiment of the present invention and, as shown in the figure, the system is configured by connecting a server 10, an image forming apparatus 20, and a client PC 30 to a network (LAN) 40.

The server 10 includes: a control portion 11 that executes functions such as a printing record list creating portion 111 for creating a printing record list (see FIG. 2) that is the feature of the present invention, a printing record list deleing portion 112, a printing record list extracting portion 113, a warning notifying portion 114, a mail creating portion 115; a storing portion 12 for storing a printing record list 121; and a communication interface 13 for connecting to a network 40.

The image forming apparatus 20 includes a control portion 21 that realizes functions described later using programs, a communication interface 22, an image forming portion 23, an ejected-paper tray 24, a tray sensor 25, a scanning portion 26, an operation displaying portion 27, and a storing portion 28. The control portion 21 includes: an authenticating portion 211 that executes processing of personal authentication for executing personal authentication printing and processing of authentication using a password for executing confidential printing; a printing record list deletion requesting portion 212 that gives a printing record list deletion request to the server 10 when a printed paper sheet is taken out of an ejected-paper tray (not shown); a printing job data control portion 213 that controls to temporarily store received printing job data or to develop that data into a bit map; and an ejected-paper tray managing portion 214 that executes processing of, when printing execution is executed from the client PC 30, ejecting a printed paper sheet into an empty ejected-paper tray and transmitting information of the ejected-paper tray number and processing of reporting to a user based on a detected signal of the tray sensor 25 that a printed paper sheet is fetched by another user by mistake. Each of the above functions is realized by executing a corresponding program.

The client PC 30 includes: a control portion 31 having a warning display processing portion 311 to execute control of the entire PC and execute various types of control including processing of executing warning display described later; an input portion 32 such as a keyboard and a mouse; a displaying portion 33; and a communication interface 34 that enables the PC to connect to the network 40.

FIG. 2 shows an example of a printing record list that the printing record list creating portion 111 of the server 10 creates based on printing execution result information (described later) sent from the image forming apparatus 20, and the list depicts a display screen image or a printed out image in a terminal device of a system manager, etc. That is, in the printing record list, items of "serial number", "information processing apparatus", "user ID", "fetch flag", "number of pages of the job", "date and time of printing", and "ejected-paper tray number" are provided as information concerning the printing result for each image forming apparatus.

"Serial number", which is given to a printing job that the client PC 30 requested to print according to image forming apparatuses, is utilized to manage the printing job information, the printing execution result information, and a printed paper sheet correlating each other. The "information processing apparatus" is PC identifying information that indicates a client PC that requested a printing job.

The "fetch flag" shows whether the printed paper sheet for a printing job has been taken out of an ejected-paper tray. The sign "x" represents a state where the printed paper sheet is present in the ejected-paper tray, that is, an unfetched state and, when the printed paper sheet is fetched, the sign "x" turns to the sign "o" that represents a state where the printed paper sheet has been fetched. A notice or a warning message to a user who has not fetched the printed paper sheet belonging to the user, described later, is provided based on this "fetch flag".

FIG. 3 shows a job list with which job information concerning a confidential printing job and a personal authenticating printing job that each user transmits from the client PC 30 to the image forming apparatus 20 is managed in the image forming apparatus 20. The job list includes items, "type of printing" that shows the type of printing such as confidential printing and personal authenticating printing, "name of file", "name of user", and "password" and the like.

The processing operations of the embodiment of the above printing system are described referring to flowcharts shown in FIGS. 4A to 8.

Figure 4A:
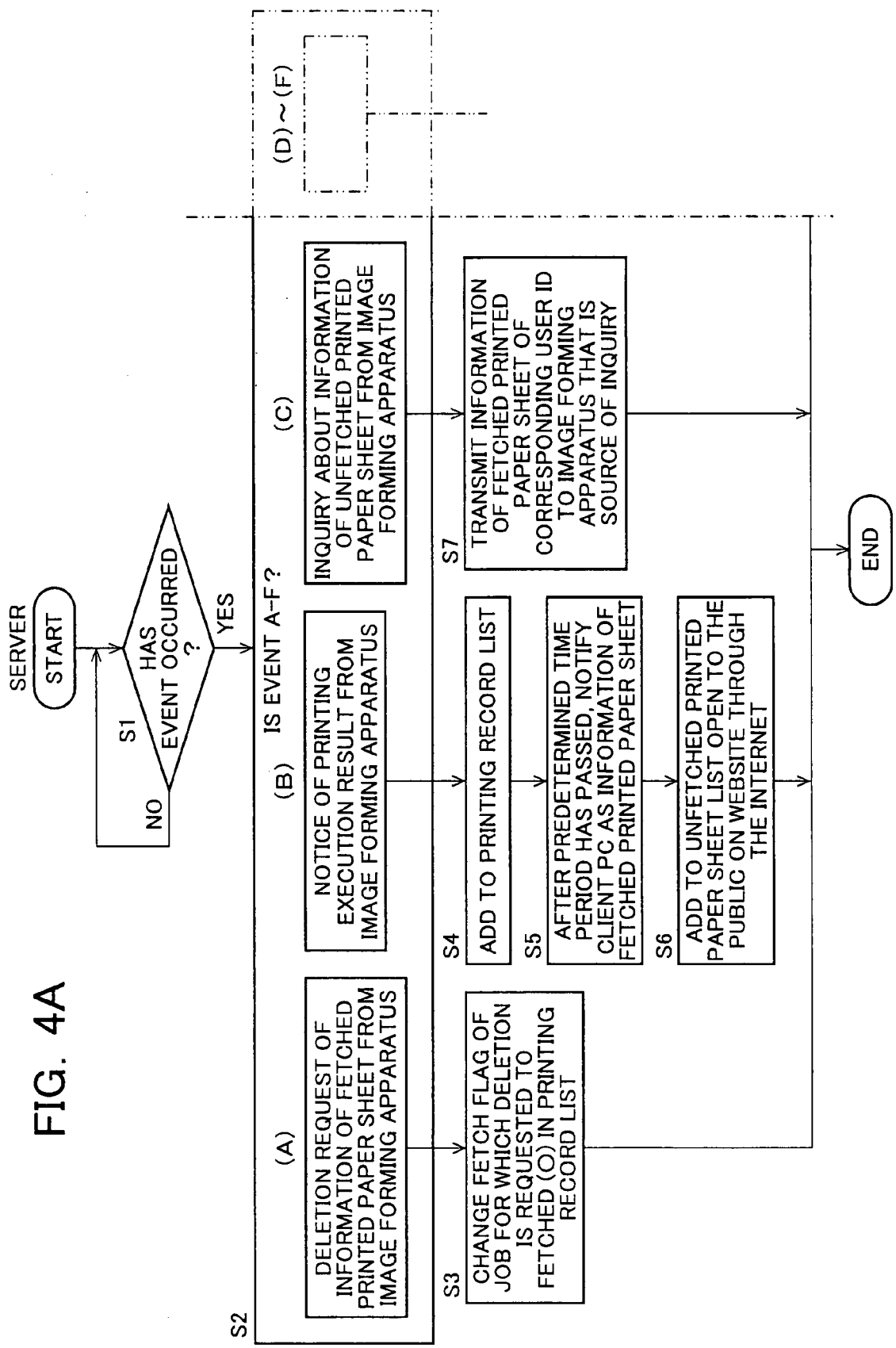

FIGS. 4A and 4B are explanatory flowcharts for the processing that the control portion 11 in the server 10 executes according to programs. When the server is started up, the server gets into an event-awaiting state (S1) and processes each event (A) to (F), respectively, that occurs according to information or a command sent from the image forming apparatus 20 or the client PC 30, or triggered by a built-in timer (S2).

The event (A) occurs due to reception of a deletion request command that is sent from the image forming apparatus 20 when a user executes an operation of taking out a printed paper sheet outputted in an ejected-paper tray in the image forming apparatus 20. When this event has occurred, the printing record list deleting portion 112 of the control portion 11 executes processing of changing the fetch flag of the printing record list shown in FIG. 2 from the sign (x) representing that the printed paper sheet has not been fetched yet to the sign (o) representing that the printed paper sheet has been fetched (S3), and ends the processing.

The event (B) occurs due to reception of the printing execution result information sent from the image forming apparatus 20 when the image forming apparatus 20 executes printing. When this event has occurred, the printing record list creating portion 111 of the control portion 11 executes processing of adding the printed paper sheet to the printing record list shown in FIG. 2 as an unfetched printed paper sheet (S4) and, when a predetermined time period (for example, one hour) that is set in advance in the timer portion 14 has passed since the time and date when the printing was executed, the information of unfetch for reporting that the printed paper sheet outputted to the ejected-paper tray by the execution of the printing is not fetched is given to the client PC 30 (S5). In addition, when another predetermined time period (for example, one day) that is set in advance in the timer portion 14 has passed since the time and date when the printing was executed, processing of adding information of the printed paper sheet to the list of the unfetched printed paper sheet that is open to the public on a website through the Internet 40, namely, the list which is created by extracting the information of printed paper sheet having a fetch flag showing exit from the printing record list shown in FIG. 2 (S6), and ends the processing. As described later, the information of unfetched printed paper sheet given to the client PC 30 at step S5 is always displayed on the client PC 30.

The event (C) occurs due to an inquiry command sent when a user who have executed printing inputs a user ID from the operation displaying portion 27 in order to check the information of unfetched printed paper sheet in the image forming apparatus 20. When this event has occurred, the printing record list extracting portion 113 of the control portion 11 executes processing of extracting an unfetched job of the corresponding user from the printing record list shown in FIG. 2 and transmitting the list to the image forming apparatus that is the source of inquiry (S7) and ends the processing.

The event (D) occurs due to an inquiry command for the information of unfetched printed paper sheet sent from the client PC 30. When this event has occurred, similarly to the case of the above inquiry command from the image forming apparatus, the printing record list extracting portion 113 of the control portion 11 executes processing of creating a list by extracting the information of unfetched printed paper sheet of the corresponding user and transmitting the list to the client PC 30 that is the source of the inquiry (S8) and ends the processing.

The event (E) occurs when the number of days during which an unfetched printed paper sheet has been left in an ejected-paper tray exceeds a predetermined time period set in advance in the timer portion 14. When this event has occurred, the warning notifying portion 114 of the control portion 11 transmits a warning message stating, for example, "Please fetch immediately your printed paper sheet left in the ejected-paper tray No. XX." to the client PC of the user who has left the printed paper sheet (S9). This warning message may be transmitted as mail from the mail creating portion 115, and the message may be transmitted not only to the client PC but also to a portable information processing terminal such as a call phone for business use when the user carries it with him or her.

The event (F) occurs when the information of ejected-paper tray is received from the image forming apparatus 20 in which the number of available ejected-paper trays thereof becomes equal to or fewer than a predetermined number. When this event has occurred, the warning notifying portion 114 of the control portion 11 executes processing of transmitting a warning message stating, for example, "Please fetch immediately your printed paper sheet because all the ejected-paper trays are getting occupied!" to the client PC 30 or the above described call phone of the user who has left his or her printed paper sheet in a tray (S10).

[Image Forming Apparatus]

Figure 5:
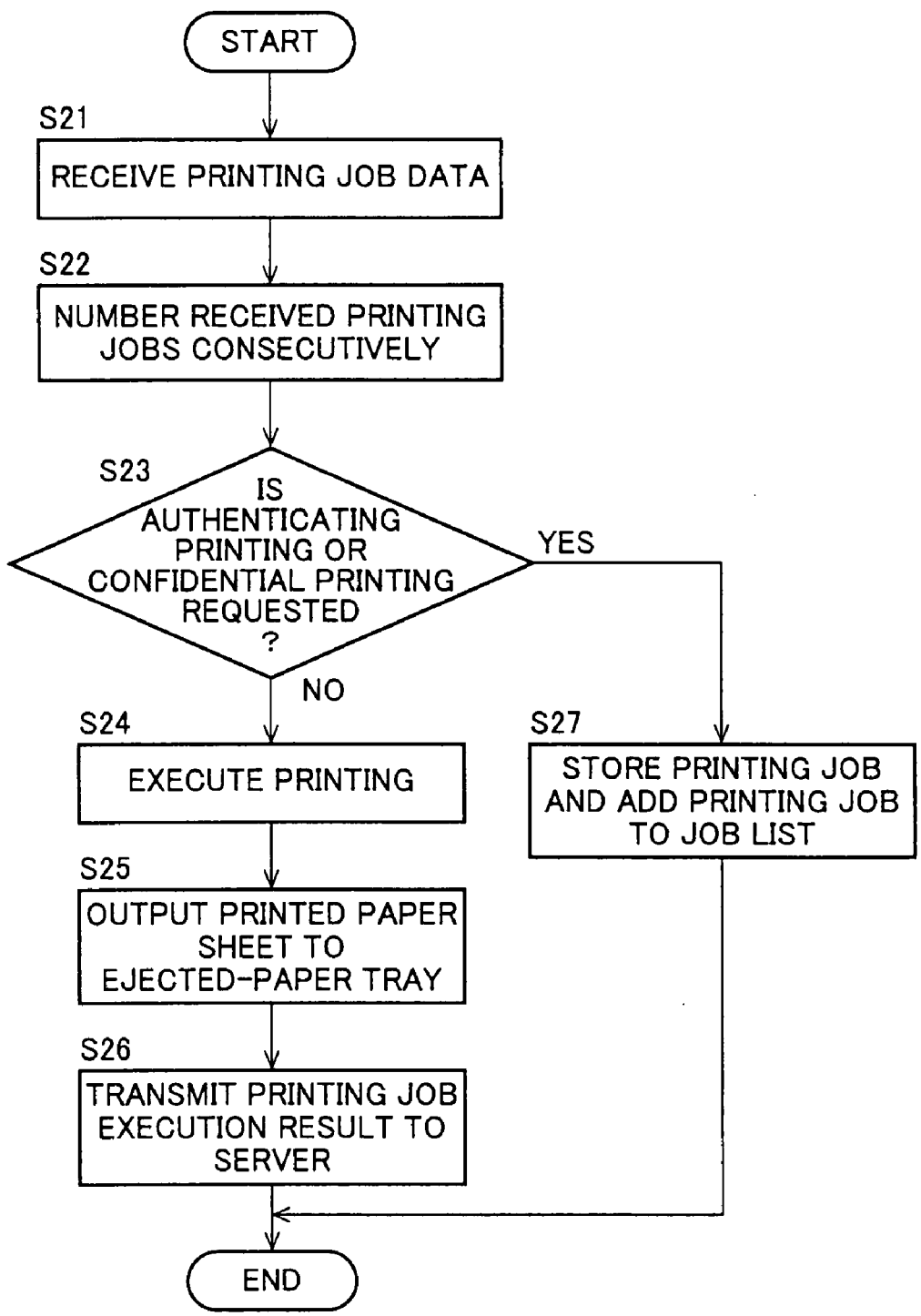
FIG. 5 is an explanatory flowchart of processing executed when the image forming apparatus receives printing job data.

FIG. 5 shows a flowchart of the processing executed when the image forming apparatus 20 receives printing job data. When the image forming apparatus 20 receives data from the client PC 30 (S21), the image forming apparatus 20 numbers to the received printing jobs consecutively as shown in FIG. 2 (S22). When the received printing job is executed in an ordinary printing mode in the client PC (S23/N), the printing is executed without making any change (S24), a printed paper sheet is outputted to a predetermined ejected-paper tray (S25), and transmits the above printing execution result information is transmitted to the server 10 (S26). In the present embodiment, a printed paper sheet that has been printed is outputted to an empty ejected-paper tray and the information of the number of the ejected-paper tray is also transmitted to the server included in the above printing execution result information as job information. When the received printing data is printed by the personal authenticating printing or the confidential printing (S23/Y), the printing job is stored together with the job list as shown in FIG. 3 as a confidential printing job 281 or a personal authenticating printing job 282 of the storing portion 28 (S27).

Figure 6A:
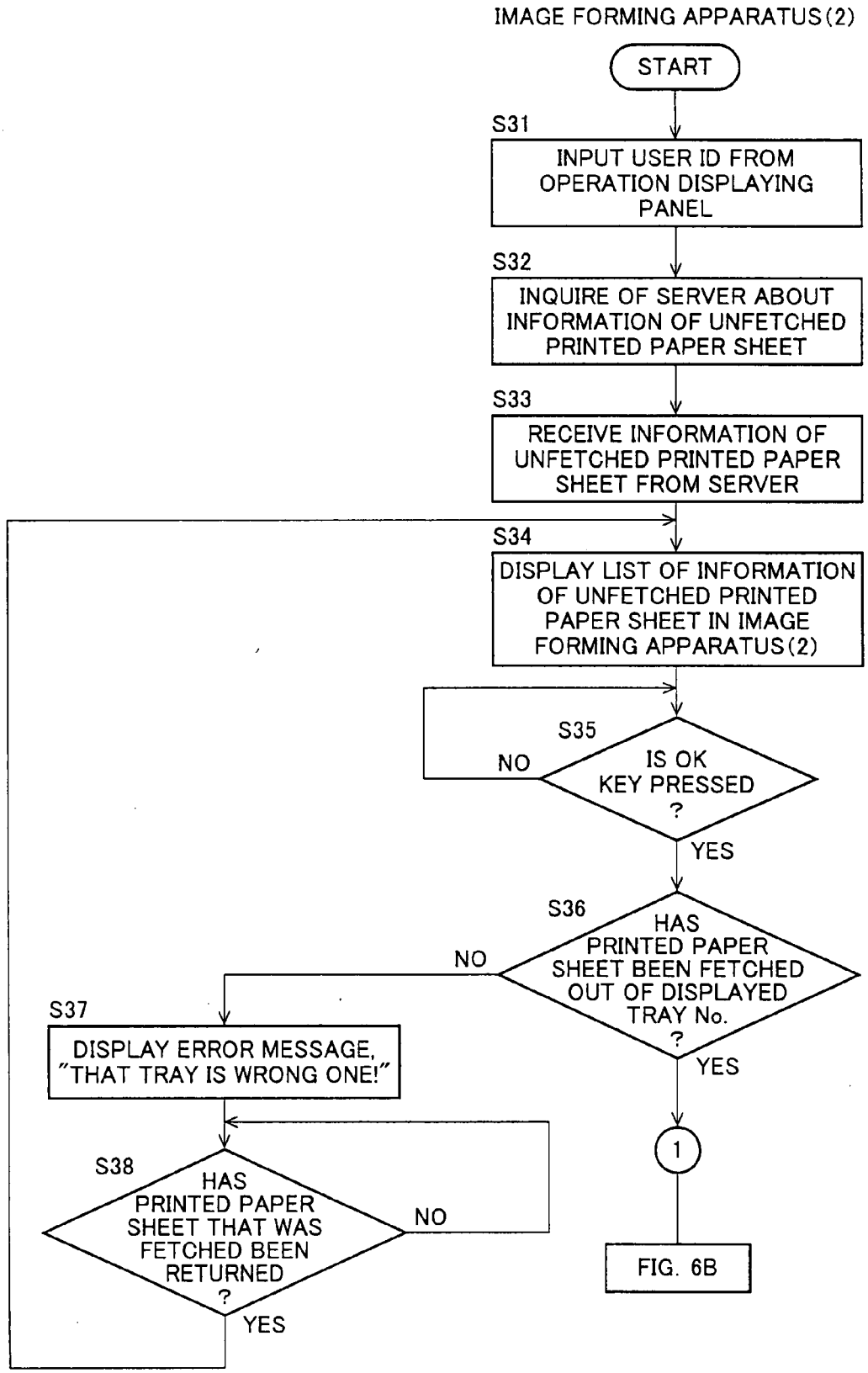
FIGS. 6A and 6B are explanatory flowcharts of processing executed when an operation of obtaining a printed paper sheet is executed in the image forming apparatus.
Figure 6B:
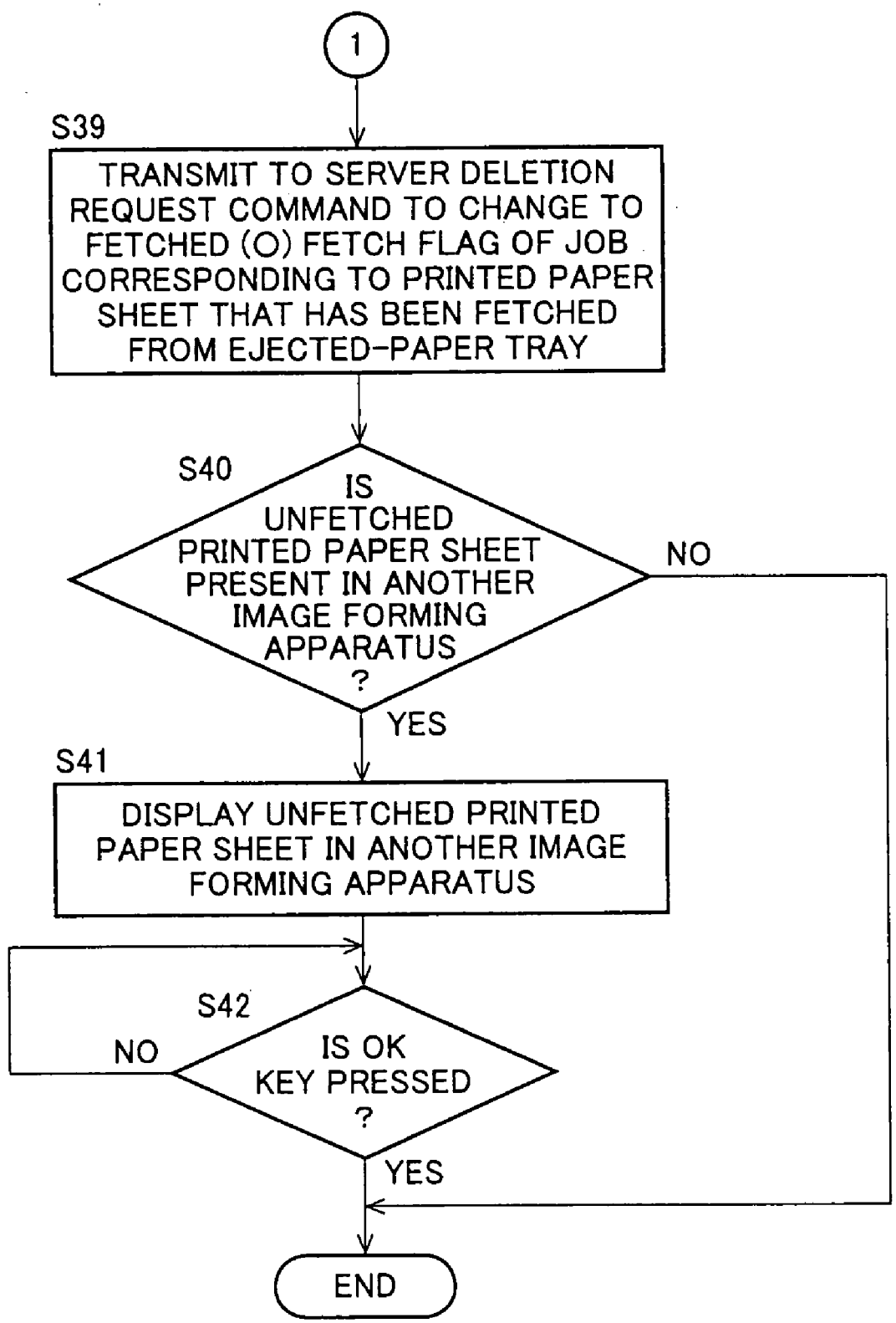
Figure 9:
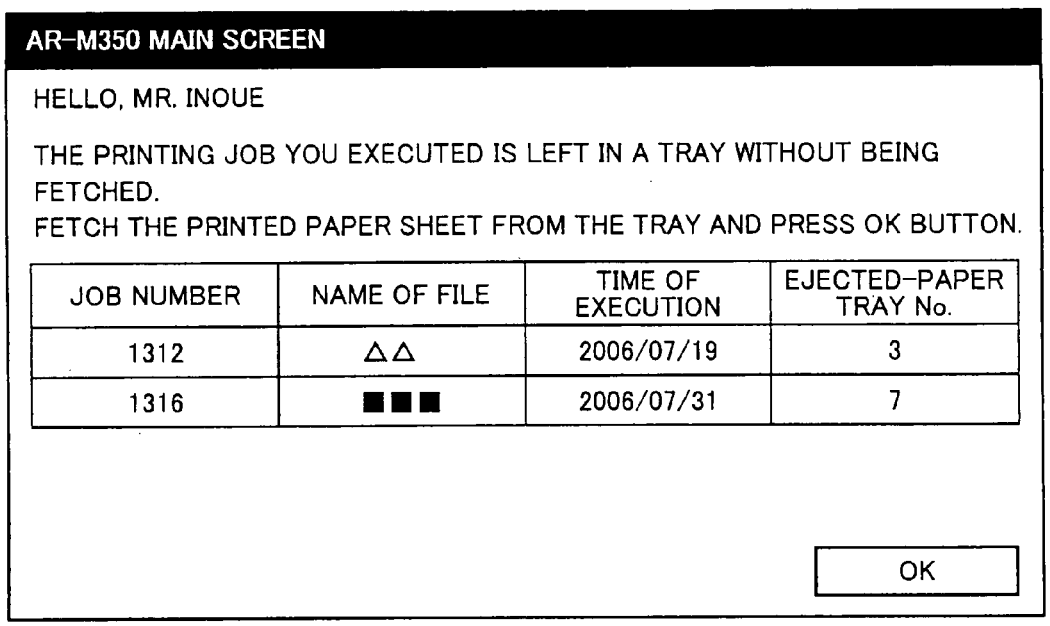
FIG. 9 depicts an example of the list of the information of unfetched printed paper sheet displayed when a user ID is inputted in the image forming apparatus.

FIGS. 6A and 6B show flowcharts of processing executed when an operation of fetching a printed paper sheet is executed in the image forming apparatus 20 by a user. When a user ID is inputted from the operation displaying portion 27 (S31), the image forming apparatus 20 makes inquiries to the server 10 about the information of unfetched printed paper sheet (S32) When the image forming apparatus 20 receives the information of unfetched printed paper sheet sent from the server 10 (S33), the image forming apparatus 20 displays the list of the information of unfetched printed paper sheet shown in FIG. 9 based on the received information (S34). As shown in FIG. 9, "ejected-paper tray number" to which the printed paper sheet is output is also displayed in the list in addition to "job number", "name of file", and "time of execution" and, then, the user fetches the printed paper sheet from the ejected-paper tray checking its number displayed and presses OK key in the screen (S35).

The ejected-paper tray managing portion 214 of the control portion 21 determines based on the detected signal of the ejected-paper tray sensor 25 whether the ejected-paper tray number for which the state of a printed paper sheet in the ejected paper tray turned from "exist" to "non-exist" coincides with the ejected-paper tray number displayed on the screen (S36) When those numbers do not coincide (S36/N), a warning message stating, for example, "The printed paper sheet that you have taken out just now is not yours!" is displayed (S37). When the user returns the printed paper sheet that the user has mistakenly taken out to the ejected-paper tray where it was (S38), the warning message is deleted and the process is returned to step S34.

When the ejected-paper tray from which the printed paper sheet is taken out is not a wrong (mistaken away) one (S36/Y), the image forming apparatus 20 transmits to the server 10 a deletion request command to delete the job information of the serial number (job number) corresponding to the printed paper sheet that was taken out, from the printing record list (S39).

Figure 10:
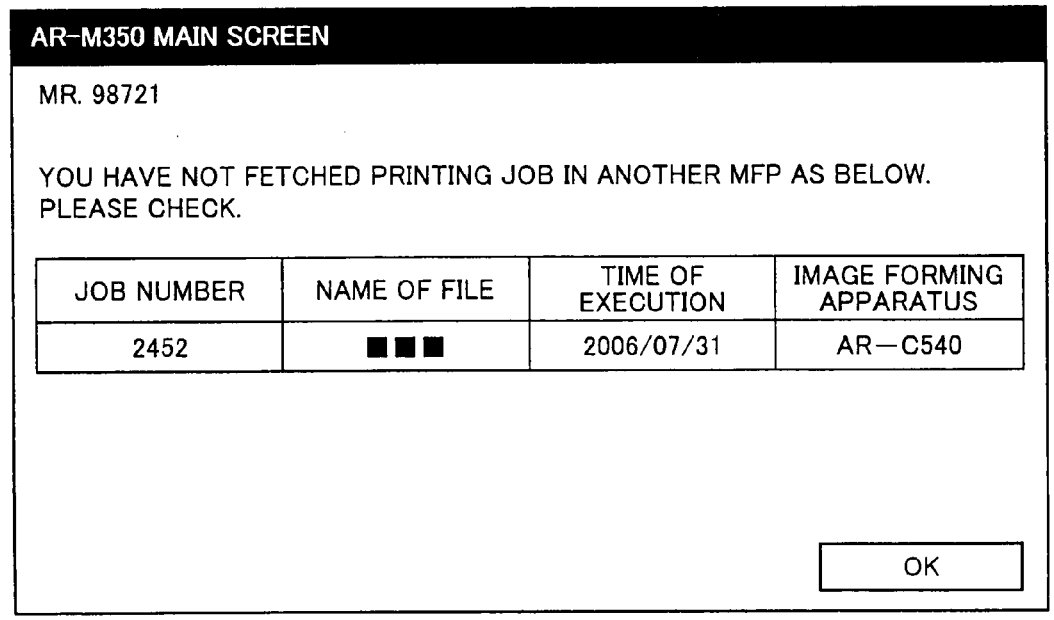
FIG. 10 depicts an exemplary display displayed next to the display screen of FIG. 9 when an unfetched printed paper sheet is present also in another image forming apparatus.

When an unfetched printed paper sheet of a user who inputted a user ID from the operation displaying portion 27 is also present in another image forming apparatus (S40/Y), a screen shown in FIG. 10 is displayed (S41). In the exemplary display shown in FIG. 10, it is shown that one printed paper sheet of the same user is present in an MFP, "AR C540". When the user checks this display and presses OK key (S42), the screen returns to a menu screen (not shown) and the process flow ends.

With an ejected-paper tray having a sensor, the present invention enables an embodiment to transmit a deleting request from the printing record list to the server using an output of the sensor even when a user takes out and carries away a printing job of the user from the ejected-paper tray without inputting the user ID from the operation displaying portion when a normal printing is executed.

Usually, a user takes out a printed paper sheet from an ejected-paper tray and checks the contents printed on the paper sheet. However, when a similar printed paper sheet happens to be outputted into an adjacent ejected-paper tray, a user happens to take out a printed paper sheet of another user by mistake. When a user took out and carried away a printed paper sheet from a wrong ejected-paper tray by mistake, the information of unfetched printed paper sheet sent to the PC of the user includes the information of the printed paper sheet that was fetched by mistake and, therefore, the user can find his or her mistake.

FIG. 7 is shows a flowchart of processing executed when received printing data is for the personal authenticating printing or for the confidential printing in the image forming apparatus 20. For the personal authenticating printing or for the confidential printing, a user comes to an image forming apparatus in which those printing jobs are stored, inputs his or her password or a personal authentication number and the like from the operation displaying portion 27, and then the printing is executed. A user selects the confidential printing or the personal authenticating printing, displaying a screen for hold printing from the menu screen (not shown) (S51). When the confidential printing is selected at step S52 (S52/A), a password input screen for the confidential printing is displayed. When the password for the confidential printing is inputted from ten keys, etc., of the operation displaying portion (S53), the authenticating portion 211 of the control portion 21 executes processing of authenticating the inputted password and, when the inputted password is authenticated (S54/Y), corresponding printing data is read from the storing portion 28 and the printing is executed (S55).

On the other hand, when the personal authenticating printing is selected at step S52 (S52/B), a password input screen for the personal authentication is displayed and, when for the password of the user is inputted from the ten keys, etc., of the operation displaying portion (S56), the authenticating portion 211 of the control portion 21 executes processing of authenticating the input password of the user and, when the inputted password of the user is authenticated, the job list of the personal authenticating printing shown in FIG. 11 is displayed (S58). When the operations are executed such as that the user selects a job to be printed by touching a job number in the displayed job list to be reversing displayed and presses an execution button, the printing of the printing job is executed (S59).

When each printing job is executed at step S55 or S59, the job information of the printing job execution result is transmitted to the server (S60).

When the password inputted at step S54 or S57 is not authenticated, an error message is displayed and the process flow ends (S61).

Description will be given for a method of informing, in the client PC, a user who has not taken out his or her printed paper sheet from an ejected-paper tray of the image forming apparatus after executing the printing, of the presence of an unfetched printed paper sheet.

Figure 12:
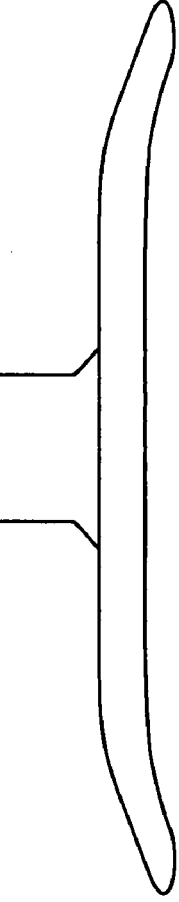
FIG. 12 depicts an example of the list of the information of unfetched printed paper sheet displayed on a displaying portion of the client PC.

FIG. 8 shows a flowchart of an example of processing in a client PC 30 to cause the client PC 30 to display the information of unfetched printed paper sheet by making inquiries from the client PC 30 to the server at a predetermined timing. This example shows that the predetermined events (for example, shutting down, logging out, and logging in, etc.) are registered in advance in the warning display processing portion 311 of the control portion 31 in the client PC 30, and when one of the registered events occurs, a command is transmitted to inquire of the server about the information of unfetched printed paper sheet. For example, when the processing of shutting down is executed (S71), a command is transmitted to inquire of the server 10 about whether unfetched printed paper sheet is present for a logged-in user (S72). When an unfetched printed paper sheet is present (S73/Y), the information thereof is sent and, therefore, the unfetched printed paper sheet list shown in FIG. 12 is displayed based on the information (S74). When no unfetched printed paper sheet is present (S73/N), the process flow ends.

The method of causing the displaying portion 33 of the client PC 30 to display the unfetched printed paper sheet may be, as described referring to FIG. 4, that the list of the information of unfetched printed paper sheet is prepared in the client PC 30 and the information of unfetched printed paper sheet is transmitted from the server 10 to the client PC 30 at a predetermined timing to update the list.

In the above embodiment, a system including a plurality of image forming apparatuses is described. However, when one image forming apparatus is connected to the system, the above functions of the server may be included in the image forming apparatus.

In this case, the image forming apparatus to which a plurality of client PCs are connected through a network includes a function of, when the image forming apparatus executes printing of a printing job received from a client PC, creating a printing record list including information on at least the client PC that requested the printing of the printing job, the logged-in user, and the time and date of the printing, and managing the fetch state of the printed paper sheets from the ejected-paper tray 24 by executing the processing of updating for changing the fetch flags in the printing record list from "unfetched" to "fetched" for the ejected-paper trays for which it has been confirmed that the printed paper sheets have been taken out therefrom, and notifying the user of the client PC that provided the printing job of the printed paper sheet for which the fetch flag shows "unfetched", of the information of unfetched printed paper sheet.

The image forming apparatus includes: a function of, when a printed paper sheet is outputted to an ejected-paper tray due to the execution of the printing, registering the tray number information into the printing record list; a function of, in the case where user identifying information is inputted from the display screen on the operation displaying portion used when the printed paper sheet is taken out from an ejected-paper tray, displaying the information of unfetched printed paper sheet of the user on the operation displaying portion; a function of including ejected-paper tray number information of the ejected-paper tray into which a printed paper sheet is outputted in the information of unfetched printed paper sheet displayed on the operation displaying portion; and a function of, when a confirmation key is pressed in the screen that displays the information of unfetched printed paper sheet, changing the fetch flag of the printing record list from "unfetched" to "fetched".

Similarly to the above printing system, the image forming apparatus includes a function of numbering printing jobs received from a client PC consecutively, managing the unfetched printed paper sheet based on this serial number information, and printing the serial number when the printing is executed.

Similarly to the above printing system, the image forming apparatus includes a function of, when the image forming apparatus receives a confidential printing job or a personal authenticating printing job from the client PC, storing those printing jobs in the storing portion and adding those printing jobs to the job list that manages the job information. And the image forming apparatus includes a function of, when the confidential printing is executed by inputting the password from the operating displaying portion, also adding the printing job to the printing record list as a printing job of "unfetched" and a function of, when the personal authenticating printing is executed by inputting the personal authentication number from the operating displaying portion, also adding the printing job to the printing record list as a printing job of "unfetched".

The image forming apparatus comprises an ejected-paper tray managing portion that manages the state of use of an ejected-paper tray based on an output signal of a tray sensor that detects whether a paper sheet is present or not, and includes a function of transmitting a warning message to the client PC of a user who has left a printed paper sheet in an ejected-paper tray by monitoring the number of available ejected-paper trays based on an output signal of the tray sensor with this ejected-paper tray managing portion, and, when the number of available ejected-paper trays becomes equal to or fewer than a predetermined number; and a function of displaying a warning on the operation displaying portion when a printed paper sheet is taken out of a tray having a number that is different from a tray number in the information of unfetched printed paper sheet displayed on the operating displaying portion.

As described above, when the image forming apparatus includes the above functions of the server, transmission and reception of information through the network are only between the image forming apparatus and the client PC and, therefore, the inconvenience that, for example, the system can not be used due to a shutdown of the server does not occur.

As described above, the present invention enables a printed paper sheet for which printing has been executed according to a printing request from a client PC to be prevented from being left for a long time in an ejected-paper tray of an image forming apparatus.

Though the above embodiment is assumed when the present invention is implemented in an office, the printing system of the present invention may be effectively used, for example, in a system for pay printing services in an Internet cafe, etc.

In this case, in addition to a server, an image forming apparatus, and a client PC, a payment terminal installed in a counter that settles the charge is connected to the system in the cafe. The present invention enables a method that, if a printed paper sheet of a printing job outputted from the client PC that the member used has been left in an ejected-paper tray, the customer who has forgotten to take out the printed paper sheet from the tray is informed of that by displaying the information of unfetched printed paper sheet of the customer on the payment terminal when the customer who has logged in and logged out using his or her membership card pays the charge at the payment counter.

In such a case, it can be simple to process the extraction of the information of unfetched printed paper sheet for the printing jobs corresponding to the membership number of the member to be displayed on the payment terminal from the printing record list by limiting the search for the information of unfetched printed paper sheet corresponding to printing jobs outputted from the time at which the member has logged in and the time at which the member has logged out.

The present invention enables to prevent a printed paper sheet for which printing has been executed according to a printing request from a client PC from being left for a long time in an ejected-paper tray of an image forming apparatus.

The present invention enables to prevent any mistake of taking out a printed paper sheet similar to the one belonging to another user from an ejected-paper tray of an image forming apparatus.

According to the present invention, when the printing of printing jobs transmitted from a third party to a plurality of users is executed, a user can take out a printed paper sheet without hesitating to judge whether it belongs to the user because the ejected-paper tray to which the user's printed paper sheet has been outputted is displayed by inputting user identifying information from the operation displaying portion.

Furthermore, according to the present invention, it is possible to know who and with which image forming apparatus printed a printed paper sheet, using a printing record list.

Yet furthermore, according to the present invention, it can be expected the effect that the number of persons who leave the printed paper sheet belonging to them is decreased because any person can check since when the printed paper sheet has been left in an ejected-paper tray by opening the information of unfetched printed paper sheet to the public on a website through the Internet.

The invention claimed is:

1. A printing system configured by connecting a server, at least one image forming apparatus, and at least one client PC to a network, in which the image forming apparatus executes a printing job that is received from the client PC, wherein
the image forming apparatus includes a plurality of ejected-paper trays each provided with a sensor to detect existence/non-existence of a printed paper sheet, wherein the image forming apparatus comprises:
a control portion configured to transmit to the server printing execution result information including at least information of the client PC that has requested printing of a printing job, a logged-in user, a date and time of the printing, and information of the ejected-paper tray to which the printed paper sheet is output, when the image forming apparatus executes printing of the printing job that is received from the client PC;

an operation displaying portion that displays information on an unfetched printed paper sheet transmitted from the server, and transmits to the server information indicating that the printed paper sheet is fetched from the ejected-paper tray by a user, when it is detected by the sensor that the printed paper sheet is fetched from the ejected-paper tray, the server configured to maintain a printing record list including at least the client PC that has requested printing of the print job, the logged-in user, the date and time of the printing, the information of the tray to which the printed paper is output, and to which a fetch flag of the printed paper sheet output to the tray for the print job is attached, based on the printing execution result information sent from the image forming apparatus, the server configured to manage a state of whether the printed paper sheet is fetched from the ejected-paper tray in the image forming apparatus by executing updating processing for changing the fetch flag from "unfetched" to "fetched" in the printing record list when the information indicating that the printed paper sheet output to the tray is fetched by the user is received from the image forming apparatus, and the server configured to give the user of the image forming apparatus or the client PC the printing record list for which the fetch flag indicates "unfetched" in response to an inquiry from the image forming apparatus or the client PC.

2. The printing system as defined in claim 1, wherein the image forming apparatus comprises a function of issuing to the server a deletion request to delete the information of unfetched printed paper sheet from the printing record list when a confirmation key is pressed down in a screen displaying the information of unfetched printed paper sheet, and wherein the server changes the fetch flag in the printing record list from "unfetched" to "fetched" when the server receives the deletion request from the image forming apparatus.

3. The printing system as defined in claim 1, wherein, when the information of unfetched printed paper sheet received from the server includes information indicating that the user also has an unfetched printed paper sheet in some other image forming apparatuses, the image forming apparatus displays the information of unfetched printed paper sheet in the other image forming apparatus when a confirmation key is pressed in the screen that displays the information of unfetched printed paper sheet received from the server.

4. The printing system as defined in claim 1, wherein the image forming apparatus comprises a function of numbering printing jobs received from the client PC consecutively, and wherein the image forming apparatus includes a serial number in the printing execution result information.

5. The printing system as defined in claim 4, wherein, when the image forming apparatus executes printing in the image forming apparatus itself, the image forming apparatus stores in a storing portion printing record data of the printing job together with the serial number.

6. The printing system as defined in claim 5, wherein the image forming apparatus comprises a plurality of ejected-paper trays, and stores the tray number of the ejected-paper tray to which a printed paper sheet was outputted when the printing was executed by including the tray number in the printing record data, and transmits the tray number to the server by including it in the printing execution result information.

7. The printing system as defined in claim 6, wherein the image forming apparatus also displays the tray number of the ejected-paper tray to which the printed paper sheet is output when the image forming apparatus displays the information of unfetched printed paper sheet on the operation displaying portion.

8. The printing system as defined in claim 6, wherein the ejected-paper tray comprises a tray sensor that detects the presence of a paper sheet in the tray, and wherein the image forming apparatus comprises an ejected-paper tray managing portion that manages the state of use of the ejected-paper tray based on an output signal of the tray sensor.

9. The printing system as defined in claim 8, wherein the ejected-paper tray managing portion monitors the number of available ejected-paper trays based on an output signal of the tray sensor and, transmits to the server ejected-paper tray information including information of the number of available ejected-paper trays when the number of available ejected-paper trays becomes equal to or less than a predetermined number.

10. The printing system as defined in claim 9, wherein, when the server receives the ejected-paper tray information from the image forming apparatus, the server transmits a warning message to a user who has left a printed paper sheet in the image forming apparatus based on the ejected-paper tray information and the information in the printing record list.

11. The printing system as defined in claim 10, wherein the warning message is transmitted to a portable information processing terminal of a user through the Internet.

12. The printing system as defined in claim 8, wherein the ejected-paper tray managing portion executes a warning display on the operation displaying portion based on the output signal of the tray sensor when a printed paper sheet was taken out from a tray having a number that is different from the tray number in the information of unfetched printed paper sheet displayed on the operation displaying portion.

13. The printing system as defined in claim 1, wherein the image forming apparatus comprises a storing portion, wherein, when the image forming apparatus receives a confidential printing job or a personal authentication printing job from the client PC, the image forming apparatus stores the printing job in the storing portion and adds the printing job to a job list that manages job information.

14. The printing system as defined in claim 13, wherein, when the image forming apparatus has executed confidential printing according to an input of a password from the operation displaying portion, the image forming apparatus transmits printing execution result information to the server.

15. The printing system as defined in claim 13, wherein, when the image forming apparatus executed personal authentication printing according to an input of a personal authentication number from the operation displaying portion, the image forming apparatus transmits printing execution result information to the server.

16. The printing system as defined in claim 13, wherein, when the image forming apparatus issues the deletion request to the server, the image forming apparatus deletes the corresponding data from the printing record data stored in the storing portion.

17. The printing system as defined in claim 1, wherein the image forming apparatus prints identification information that identifies a printed paper sheet by including that information in the printed paper sheet when the image forming apparatus executes printing.

18. The printing system as defined in claim 1, wherein the server transmits a warning message to a user who has left a printed paper sheet in an ejected-paper tray for a time period that is longer than a predetermined time period based on printing date and time information in the printing record list.

19. The printing system as defined in claim 1, wherein the client PC inquires of the server about whether the information of unfetched printed paper sheet exists when an event that is registered in advance occurs, and displays the information of unfetched printed paper sheet when that information is sent from the server.

20. The printing system as defined in claim 19, wherein the events registered in advance include at least any of shutting down, logging out, or logging in.

21. An image forming apparatus to which one or more client PCs are connected through a network, wherein
the image forming apparatus comprises:
a plurality of ejected-paper trays each provided with a sensor to detect existence/non-existence of a printed paper sheet, and
a control portion that is configured to communicate printing execution result information with a server when the image forming apparatus executes printing of a printing job that is received from the client PC, wherein the server maintains a printing record list including information on at least the client PC that requested printing of the printing job, a logged-in user, and a date and time of the printing, information of the ejected-paper tray to which the printed paper sheet is output, and a fetch flag of the printed paper sheet, and wherein the printing execution result information includes at least information of the client PC that has requested printing of the printing job, the logged-in user, the date and time of the printing, and the information of the ejected-paper tray to which the printed paper sheet is output,
the control portion configured to communicate with the server for executing updating processing to change the fetch flag in the printing record list from "unfetched" to "fetched" for the printed paper sheet that was fetched from the ejected-paper tray, and
the control portion configured to display on an operation displaying portion information received from the server of an unfetched printed paper sheet to a user of the client PC that provided the printing job of the printed paper sheet for which the fetch flag indicates "unfetched".

22. A server in a printing system configured by connecting the server, at least one image forming apparatus having a plurality of ejected-paper trays each provided with a sensor to detect existence/non-existence of a printed paper sheet, and at least one client PC to a network, in which the image forming apparatus executes a printing job that is received from the client PC, wherein
the server is configured to maintain a printing record list including at least the client PC that has requested printing of the print job, a logged-in user, a date and time of the printing, and information of the tray to which the printed paper sheet is output, and to which a fetch flag of the printed paper sheet output to the tray for the print job is attached, based on printing execution result information on the print job executed by the image forming apparatus sent from the image forming apparatus,
the server configured to manage a state of fetch of the printed paper sheet in the image forming apparatus by executing changing processing for changing the fetch flag of the printed paper sheet output to the tray from "unfetched" to "fetched" when information indicating that the printing paper sheet output to the tray is fetched by a user is received from the image forming apparatus, and
the server configured to give information of the unfetched printed paper sheet to a user of the client PC that provided the printing job of the printed paper sheet for which the fetch flag shows "unfetched".

23. A client PC in a printing system configured by connecting a server, at least one an-image forming apparatus having a plurality of ejected-paper trays each provided with a sensor to detect existence/non-existence of a printed paper sheet, and at least one of the client PC to a network, in which the image forming apparatus executes a printing job that is received from the client PC, wherein
the image forming apparatus executes the printing job, while transmitting to the server printing execution result information on the executed printing job including at least the client PC that has requested printing of the print job, a logged-in user, a date and time of the printing, and information of the tray to which the printed paper sheet is output,
the server creates a printing record list to which a fetch flag of the printed paper sheet output to the tray including at least the client PC that has requested printing of the print job, the logged-in user, the date and time of the printing, and the information of the tray to which the printed paper sheet is output is attached, based on the printing execution result information, and manages a state of fetch of the printed paper sheet in the image forming apparatus by executing changing processing for changing the fetch flag of the printed paper sheet output to the tray from "unfetched" to "fetched" when information indicating that the printing paper sheet output to the tray is fetched by a user is received from the image forming apparatus, wherein
the client PC inquires of the server about whether information of an unfetched printed paper sheet exists in the ejected-paper tray when an event registered in advance in the server occurs, and displays the information of the unfetched printed paper sheet when the information is sent from the server.

* * * * *